United States Patent
Straub et al.

(10) Patent No.: US 7,053,780 B1
(45) Date of Patent: May 30, 2006

(54) METHODS, SYSTEMS, AND DEVICES FOR LOCATION SPECIFIC ALERTS

(75) Inventors: Henry J. Straub, Olathe, KS (US); Bronson D. Hokuf, Olathe, KS (US)

(73) Assignee: Garmin Ltd. (KY)

( * ) Notice: Subject to any disclaimer, the term of this patent is extended or adjusted under 35 U.S.C. 154(b) by 13 days.

(21) Appl. No.: 10/675,711

(22) Filed: Sep. 30, 2003

(51) Int. Cl.
*G01W 1/00* (2006.01)

(52) U.S. Cl. ............ 340/601; 340/500; 340/905; 702/3

(58) Field of Classification Search .......... 340/541, 340/601, 500, 539.1, 905, 506, 426.19; 702/3
See application file for complete search history.

(56) References Cited

U.S. PATENT DOCUMENTS

| | | | | |
|---|---|---|---|---|
| 5,948,041 | A | 9/1999 | Abo et al. ............ | 701/207 |
| 5,963,130 | A | 10/1999 | Schlager et al. ........ | 340/540 |
| 5,991,687 | A * | 11/1999 | Hale et al. ............ | 701/207 |
| 5,999,126 | A | 12/1999 | Ito ..................... | 342/357.1 |
| 6,018,699 | A | 1/2000 | Baron, Sr. et al. ...... | 702/3 |
| 6,028,514 | A * | 2/2000 | Lemelson et al. ...... | 340/539.13 |
| 6,084,510 | A * | 7/2000 | Lemelson et al. ...... | 340/539.13 |
| 6,091,954 | A | 7/2000 | Haartsen et al. ........ | 455/447 |
| 6,199,045 | B1 | 3/2001 | Giniger .................. | 705/1 |
| 6,351,218 | B1 * | 2/2002 | Smith ................... | 340/601 |
| 6,381,535 | B1 | 4/2002 | Durocher .............. | 701/202 |
| 6,505,123 | B1 | 1/2003 | Root et al. ............. | 702/3 |
| 6,509,833 | B1 * | 1/2003 | Tate ..................... | 340/539.1 |
| 6,535,164 | B1 * | 3/2003 | Imazeki et al. ........ | 342/357.17 |
| 6,603,405 | B1 * | 8/2003 | Smith ................... | 340/905 |
| 6,754,585 | B1 | 6/2004 | Root ..................... | 702/3 |
| 6,826,481 | B1 | 11/2004 | Root ..................... | 702/3 |
| 6,836,730 | B1 | 12/2004 | Root ..................... | 702/3 |

OTHER PUBLICATIONS

Abstract of JP8221694, Published Aug. 30, 1998 by Niimi Hiroshi.

* cited by examiner

*Primary Examiner*—Phung T. Nguyen
(74) *Attorney, Agent, or Firm*—Devon A. Rolf

(57) ABSTRACT

Methods, systems, and devices for location specific alerts. The method can include determining one or more positions using a navigation device. One or more weather signals received on at least a first channel of the navigation device, where the one or more weather signals include location information, can be compared to the one or more positions. From the comparison, a weather alert can be generated in the navigation device. Determining the one or more positions further includes determining the positions from a global positioning system (GPS) enabled navigation device.

38 Claims, 8 Drawing Sheets

METHODS, SYSTEMS, AND DEVICES FOR LOCATION SPECIFIC ALERTS

FIELD OF THE INVENTION

The present invention relates generally to alert methods, systems, and devices; and, more particularly, to global positioning system (GPS) based location specific alert methods, systems, and devices.

BACKGROUND OF THE INVENTION

National Weather Radio (NWR), a division of the National Oceanic and Atmospheric Administration (NOAA) broadcasts continuous weather related information in the VHF frequency band between 162.400 and 162.550 MHZ. This information is repeated every 4 to 6 minutes and updated every one to six hours throughout the day. When sever weather (or any other event that poses a threat to life and/or property) occurs, the information is updated more frequently.

In the event of sever weather, a unique message is broadcast—one that is preceded by a warning alert tone (WAT). The WAT has a frequency of 1050 Hz and can be broadcast for 8 to 10 seconds. This tone allows a weather radio to detect the warning, respond by sounding an alarm, and unmuting its audio so that a user can listen to the sever weather alert. In addition to the WAT, NWR has implemented an advanced alerting system known as "Specific Area Message Encoding" (SAME). This system adds a digital message, consisting of the warning and its target location, to the weather alert so that specially equipped radio receivers can provide a more location-specific weather alert. One weather radio that takes advantage of SAME is the "Radio Shack 7-Channel Weatheradio with NWR-SAME Severe-Weather Alert." This radio can receive and process the digital message provided by NWR, but requires the user to input specific county codes into the device through a keypad. This radio can be set to sound an alarm when the National Weather Service issues a weather warning, watch, or statement that corresponds with the user-selected county codes. The radio can also be configured to give a visual indication of the type of weather alert being broadcast instead of an audible alarm.

DETAILED DESCRIPTION

Figure 1B:
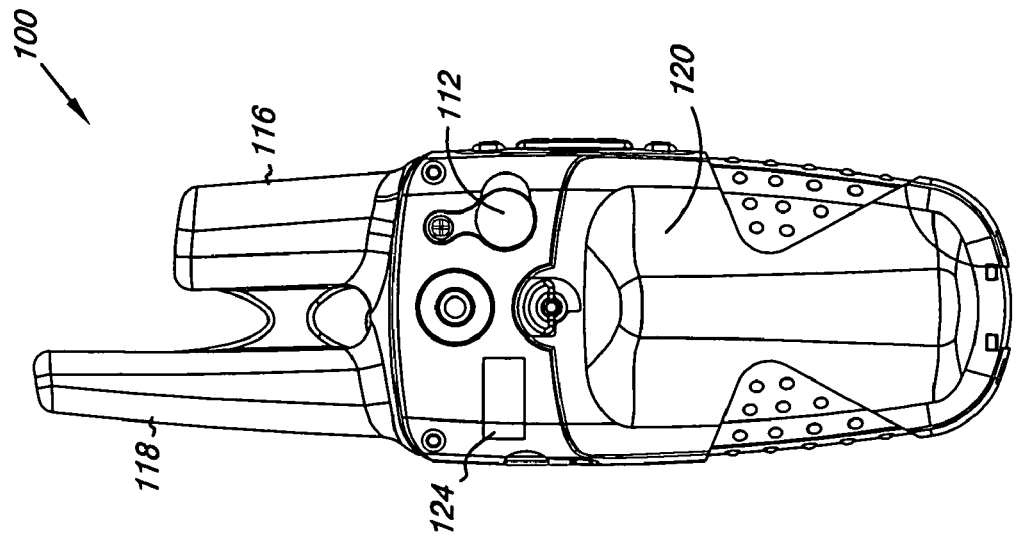
FIG. 1B illustrates a rear view of the navigation device embodiment shown in FIG. 1A.
Figure 1A:
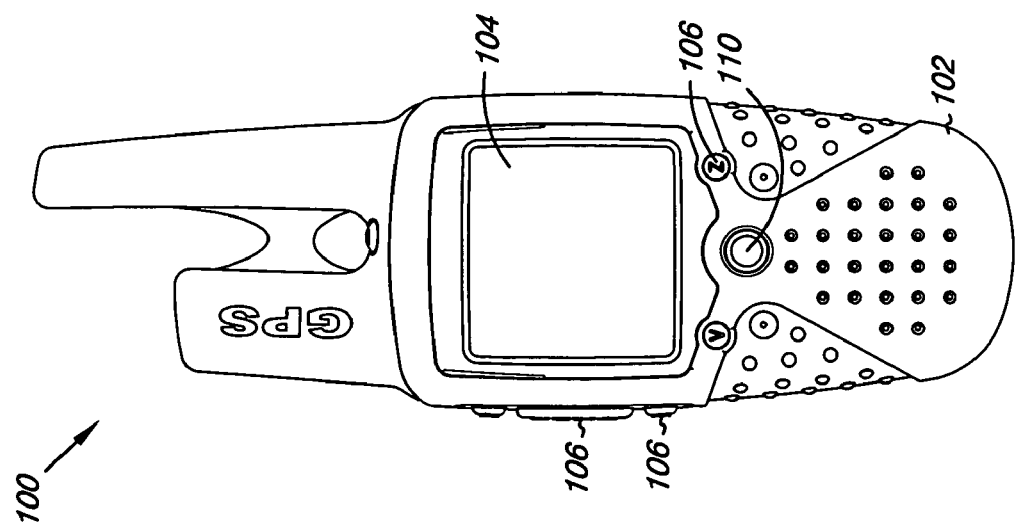
FIG. 1A illustrates a front view of an embodiment of a navigation device.

FIG. 1A illustrates a front view for an embodiment of a navigation device 100 according to an embodiment of the present invention. Navigation device 100 can be used as a portable navigation device for use on land, water or in the air. In addition, device 100 can also be used as a stationary navigation device, where the device can be temporarily, or permanently, attached to one or more structures (e.g., a dashboard of an automobile, a boat, or a backpack).

Navigation device 100 includes, but is not limited to a protective housing 102 suitable to protect the device's internal structure, including electronics, in an air, land, or water environment. In the various embodiments, protective housing 102 includes a fully gasketed, high-impact strength plastic or plastic/alloy, waterproof case. This is but one example, and other protective housings 102 (e.g., metal or metal alloy) are possible. Navigation device 100 also includes a display 104. Any number of displays can be suitable for use with the device. For example, in one embodiment, display 104 includes a liquid crystal display (LCD). Another example of display 104 includes, but is not limited to, a thin film display, a color display, or any other suitable display. One example of the navigation device 100 includes the RINO global positioning system (GPS)-integrated Family Radio Service (FRS)/General Mobile Radio Service (GMRS) navigation as manufactured by Garmin International, Inc. of Olathe, Kans. Embodiments of the present invention can also be used in other devices having GPS and/or radio communication capabilities.

Display 104 is operable to present a number of different screen displays. The number of different screen displays include, but are not limited to, a map display, including a split-screen moving map; a new contact display, including a map display with new contact; a map display with a "goto" point; a radio display, including, for example, channel selection and squelch code settings; address lookup for use with downloaded cartographic data of a map; a navigation display, including, for example, graphic compass, distance to destination, speed, and time of arrival prediction; point of interest display; listing of address display; trip computer display, including, for example, trip odometer, average and maximum speeds, travel time, and location; and waypoint display for setting waypoints or locations. As will be explained in more detail below, in the various embodiments of the present invention, navigation device 100 includes one or more cartographic maps, including a basemap, operable thereon to show lakes, rivers, cities, highways, streets, counties boundaries, and state boundaries on display 104.

Navigation device 100 includes a number of input devices 106 such as a power on/off button, a call button to send out a call tone and/or a position signal, a talk button for transmitting a voice signal, and the like. Input devices 106 can also include the multiposition (e.g., 3-axis) data entry button 110 for use with display screen 104.

FIG. 1B is a rear view for an embodiment of navigation device 100. Navigation device 100 includes a data port 112 operable to upload and download data between navigation device 100 and another electronic device, such as a USB connector or other suitable connection (e.g., an RS232). In some embodiments, as will be discussed below, data can be uploaded and downloaded to the navigation device 100 using a transceiver in device 100 which can accommodate a wireless transmission medium such as, for example, infrared, Bluetooth, and/or Radio Frequency (RF) signals. Other transmission medium might also be used. In the various embodiments of the present invention and as will be explained further herein, the data port is operable to upload and download Jeppesen data, device software, and/or other cartographic data. Navigation device 100 can further include at least one antenna, including GPS antenna 116 and two-way radio antenna 118.

Device 100 further includes a battery port 120 for housing batteries such as "AA" batteries and the like. An external power supply port can also be operatively coupled to device 100 electronic components. Likewise, device 100 can include an electronic device having a data card slot, or data card port 124. Device 100 can further include a mounting bracket (not shown) so that the device 100 can be selectably and removably mounted on a removable clip (e.g., belt clip) and/or other stationary surface.

The illustrations shown in FIGS. 1A and 1B are but one example of a hardware configuration for an electronic device according to the embodiments of the present invention. The invention is not limited to the embodiment shown in FIGS. 1A and 1B, and other configurations are considered within the scope of the present invention.

Figure 2:
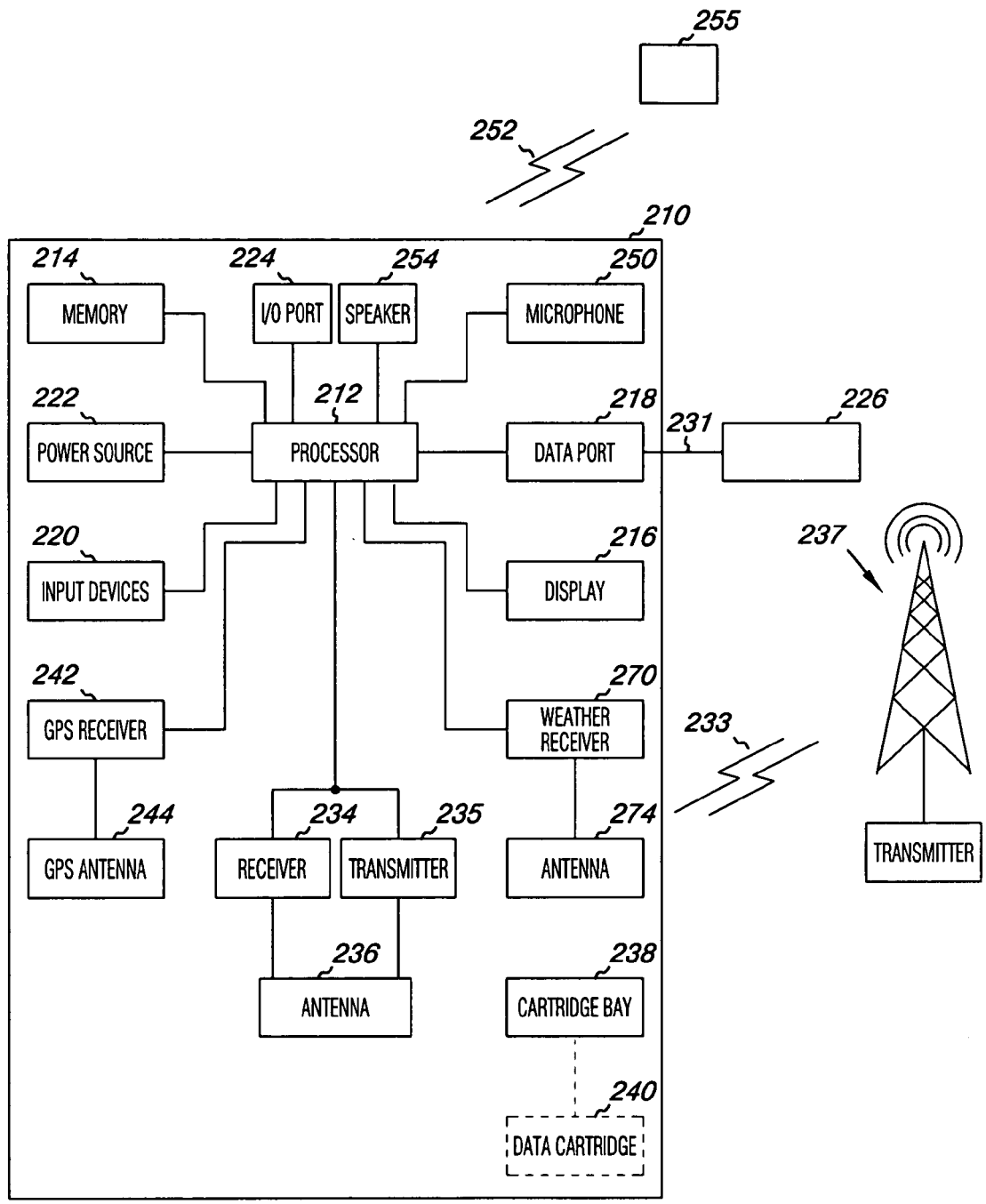
FIG. 2 is a block diagram of electronic components of one embodiment according to the present invention.

FIG. 2 is a block diagram of one embodiment for the electronic components associated with the present invention. The electronic components are discussed in connection with a navigation device 210 such as navigation device 100 shown in FIG. 1. Embodiments of the invention, however, are not so limited. As shown in FIG. 2, the embodiment of navigation device 210 can include a processor 212, a memory 214, a display 216, one or more data ports 218, input devices 220, a power source 222, and one or more I/O ports 224.

The components recited herein can operably communicate with one another. In particular, the memory 214 can include computer executable instructions which can be operated on by various components of device 210 (e.g., processor 212) to provide the embodiments of the present invention. Input 220 can include an alphanumeric keypad, such as a telephone keypad, a microphone/voice recognition input, or touch screen, or a menu-driven display input which may be used to select and input a name or other identifier for the unit using any combination of the letters, numbers or symbols which are available on the device 210.

Additionally, as shown in the embodiment of FIG. 2, data port 218 is operable to upload and download data between device 210 and another electronic device 226, such as a laptop computer, personal digital assistant (PDA), testing apparatus, cell phone, other intelligent appliance, or the like, via a communication link 231. Communications link 231 can include any hardwired or wireless communications link. The invention, however, is not so limited. For example, the information can be received from sources such as wired or wireless connections (e.g., infrared, Bluetooth, and/or Radio Frequency (RF) signals) employing public or proprietary interfaces and/or protocols.

As shown in FIG. 2, the various embodiments of navigation device 210 include a data card slot, or data card port, cartridge bay or other receptacle of the like 238 for receiving a data cartridge 240. Cartridge bay 238 and data cartridge 240 allow navigation device 210 to access and utilize data stored on an external data cartridge. Data cartridge 240 can be used to transfer a wide range of data, including but not limited to cartographic data, avionics navigation data, automotive navigation data, marine craft navigation data, waypoints, and points of interest, to memory 214 of navigation device 210.

Navigation device 210 further includes a global positioning system (GPS) receiver 242 operably coupled to processor 212, memory 214 for handling GPS signals received by a GPS antenna 244. GPS receiver 242 and antenna 244 operate in conjunction with software, e.g. computer executable instructions, the processor 212, and the memory 214 to enable the navigation device 210 to determine, or resolve, a position of the navigation device. In one embodiment, the GPS antenna 244 can also include an antenna port for operatively coupling an external antenna to the device 210. In some embodiments, a GPS operable with the navigation device 210 includes a wide area augmentation system (WAAS) capability that allows for even more precise location resolution, as the same will be known and understood by one of ordinary skill in the art.

Navigation device 210 can further include a first receiver 234 and a first transmitter 235 operatively coupled to an additional antenna 236. In one embodiment, the additional antenna 236 can also include an antenna port for operatively coupling an external antenna to the device 210. The functions of first receiver 234 and first transmitter 235 may be separate components, as illustrated, or combined into a single transceiver operably coupled to processor 212. Receiver 234 and transmitter 235 can be used to wirelessly transmit and receive voice data signals with other electronic devices (e.g., another navigation device). Navigation device 210 can further include a microphone 250 and a speaker 254 having associated amplifiers and circuitry, and be interfaced or coupled to processor 212 to facilitate two-way wireless voice, video, and/or data communication. In one embodiment, the device 210 can further include ports for operatively coupling an external microphone and/or an external speaker.

As explained in more detail below, navigation device 210 can wirelessly communicate with a plurality of other navigation devices. For example, the other devices can include transceivers tuned to the broadcast frequencies of navigation device 210 to allow data, including voice and position related data, to be transmitted and received between the devices. This allows the user of navigation device 210 to communicate with and track the location of users of other electronic devices.

For example, first receiver 234 and first transmitter 235 can be used to communicate voice data with, e.g. to transmit and receive voice data signals, another two-way radio 255 via a wireless communication channel 252. Communication channel 252 is, however, not limited to a particular communication technology. In one example, communication channel 252 is capable of wireless communication such as radio frequency, microwave frequency, infrared communication, and the like. Additionally, according to various embodiments, communication channel 252 accommodates satellite communication between navigation devices.

The voice data signals transmitted through communication channel 252 can be according to any particular communication technology and/or protocol. For example, the signals may be adapted to be used in cellular communication technology, such as time division multiple access (TDMA), frequency division multiple access (FDMA), code division multiple access (CDMA), global system for mobile communications (GSM), third generation (3G) GSM/CDMA, Family Radio Service (FRS), General Mobile Radio Service (GMRS), and the like. Both digital and analog signals may be transmitted through communication channel 252. According to various embodiments, these signals are modulated, encrypted and/or compressed signals as may be desirable for the communication technology.

In addition to an embodiment that includes two-way radio service, embodiments of the device herein can resolve the devices location and communicate that location data to other devices based on received location signals. For example, the GPS antenna and receiver are operable to receive GPS signals and determine a position based thereon. This location information can be communicated to other devices. One way to communicate the location data over the wireless network can be to divide the available bandwidth into a voice portion and a data portion so that voice and data are communicated simultaneously over a wireless medium.

As shown in the embodiment of FIG. 2, navigation device 210 further includes a weather receiver 270 operatively coupled to antenna 274 and processor 212 for receiving one or more weather signals 233. In one embodiment, the antenna 274 can also include an antenna port for operatively coupling an external antenna to the device 210. Examples of weather signals 233 include information broadcast by the National Oceanic and Atmospheric Administration (NOAA) Weather Radio (NWR) alerting system. These signals can include Specific Area Message Encoding (SAME) signals that have location information on the type of message, location information (e.g., the county affected), and the expiration time of the message. SAME signals can provide alerts on a county-by-county basis, or part of a county, for a variety of events. For example, message event codes can include, but are not limited to, tornado warning (TOR), severe thunderstorm warning (SVR), flash flood warning (FFW), tornado watch (TOA), severe thunderstorm watch (SVA), hurricane watch (HUA), hurricane warning (HUW), national emergency (EAN 2), flash flood watch (FFA), winter storm warning (WSW), high wind warning (HWW), tsunami watch (TSA), tsunami warning (TSW), river flood watch (FLA), river flood warning (FLW), special marine warnings, and local non-weather emergencies (CEM). Within a SAME alerting system, a SAME signal also includes a Warning Alarm Tone (WAT) signal. By way of example and not by limitation, a WAT signal is generally broadcast at a frequency of 1050 Hz for 8 to 10 seconds.

The SAME signal can be transmitted using Audio Frequency Shift Keying (AFSK), on the audio channel of the very high frequency (VHF) National Oceanic and Atmospheric Administration (NOAA) Weather Radio (NWR) transmitter system 237. Transmitter frequencies for NWR SAME include frequencies in the Very High Frequency (VHF) band from 162.400 to 162.550 MHz. The location information contained in the SAME signal includes NWR SAME six-digit code number for the county(s) affected by the alert. All, or part, of the available NWR SAME six-digit code number for the counties covered by the NWR transmitter system can be stored in device 210. For example, memory 214 can be used to retrievably store one or more NWR SAME six-digit code number. The GPS capability, e.g. software, GPS receiver and GPS antenna, of navigation device 210 can be used to determine the location of the device, and based on that location information the SAME code number for the county in which the device is located can be accessed and retrieved. According to various embodiments, the SAME code numbers for adjacent counties to the current county can also be acquired for use by device 210. In one embodiment, adjacent counties include those counties that share a border with the county in which the device 210 is located.

Once a SAME signal is received, software (e.g., a set of computer executable instructions) is executable on the device processor 212 to compare the location information of the one or more weather signals, for example from the SAME signal, with the position of the navigation device. As discussed herein, the location of the navigation device can be based on a position derived from GPS, or other triangulation signals (e.g., radio signals). Based on the position information, the relevant SAME codes for the county, including any adjacent counties, can be derived by the processor 212. In one embodiment, when the location of the device, or its heading or calculated route, described in more detail herein, and the location for the SAME signal are the same, processor 212 can be used to actuate a weather alert in the device 210 based on a result of the comparison.

In addition, navigation device 210 can further monitor its position relative to counties that surround the county in which navigation device 210 is presently located. For example, device 210, located in a first county, can provide a weather alert for one or more adjacent counties based on any number of user selectable criteria. For example, the alert can be issued when the navigation device 210 is determined to be within a predetermined distance of the adjacent county that is the subject of a SAME signal. In an additional example, an alert can be issued when the navigation device 210 is heading in the direction of, or has a waypoint in, an adjacent county that is the subject of a SAME signal. In addition, processor 212 can execute a navigational program (e.g., a set of computer executable instructions) operable to perform a routing algorithm to calculate a route between at least two of a number of waypoints. The number of waypoints can be, for example, stored as cartographic data in memory 214. According to one embodiment of the present invention, processor 212 can execute a program or software operable to compare the one or more waypoints of the route with the location information of the one or more SAME signals, and generate a weather alert in the device 210 based on the comparison.

A heading of the device 210 can be determined in any number of ways. For example, the heading of the device 210 can be determined by the GPS capabilities of the device 210, a calculated route of the device 210, and/or by a track log history of the device. Processor 212 can operate on the heading information and with the location information of one or more weather signals received from the SAME signals compare the heading information. In addition, processor 212 can actuate the weather alert in the device 210 based on the result of the comparison. So, for example, processor 212 can actuate the weather alert when the heading will take the device into an area, e.g., an adjacent county, that is the subject of a SAME signal.

In a further embodiment, when processor 212 has actuated the weather alert, processor 212 can receive data on a selected position through at least one input operably coupled to processor 212. For example, the selected position can include a destination point (e.g., a shelter such as a cabin, or a car), that may include one or more waypoints, as selected by the user of navigation device 210. An example of the input includes display 216 of navigation device 210. Processor 212 can operate on the routing algorithm to plot a route between the present position, as determined by GPS receiver 242, and the selected position. In an additional embodiment, the device 210 can auto-select destination points for the user.

Processor 212 can also operate on a routing algorithm to calculate a route that may include one or more waypoints. In one embodiment, the starting point and the destination point of the route are determined and set by the user of navigation device 210. Processor 212 can operate on a comparison algorithm to compare the route, including the one or more waypoints, with the location information from the SAME signals. Processor 212 actuates the weather alert based on the result of the comparison. So, for example, processor 212 actuates the weather alert when the route will take the device into an area, e.g., a county, that is the subject of a SAME signal.

When device 210 receives a SAME signal for the county in which device 210 is located, device 210 can respond in a variety of predetermined ways. For example, device 210 can turn on an audio output device, such as speaker 254, to audibly present the weather alert, interrupt a voice and/or data transmission of device 210 to provide the weather alert based on the SAME signal, capture and rebroadcasting NWR messages through speaker 254 of the device to other in-communication devices, graphically present the weather alert on display 216 of device 210, or activate other types of attention signals. Receiver 270 can be operated in a muted "standby" or "alert" mode, and will turn on when a relevant weather alert (e.g., SAME signal) is received. Upon activation, receiver 270 may cause processor 212 to produce a flashing light, a change in an image on display 216, or provide other visual indicators to be produced by the device 210. In addition, the 8 to 10-second WAT signal (1050 Hz warning alarm tone), or other tone, can be used as an audible attention signal.

As mentioned above, the device 210 can receive a SAME signal over the wireless communications network. One way for the SAME signal to be received over the wireless network can be to divide the available bandwidth into a voice portion and a data portion so that voice and SAME signals are simultaneously received over the wireless medium. In an additional example, the communication channel can be used for voice communication except for periodic interruptions during which a transmitted SAME signal can be received. The timing for receiving an available SAME signal can be on the GPS clock. A third approach for receiving a SAME signal would be to monitor the network for the absence of voice communication, during which time a SAME signal can be received.

The electronic device as described herein can operate to allow for multiple displays screens having a variety of data to be presented to the user. In addition, input keys on the device can be used to search for predefined or user created waypoints such as, cities, highway exits, camp location, car location, boat location, boat launches, tide stations, and the like. The device can also include software that is operable on the device to search for points of interest, street addresses, street intersection (crossroads), and the like. Such information can be viewable in different formats, including, e.g., by "name" (a list of every item available for a category) or by "nearest" (a list of only those items for a category that are nearby). Using the GPS capabilities of the device, the "nearest" list updates continuously. This is useful in the instance of a SAME signal alert in order to assist a device user to locate and move to adequate shelter quickly.

For example, the view of the "nearest" format may be useful to allow a user to quickly identify a suitable destination point when a weather alert is issued. Additional information for waypoints such as, for example, harbors, storm shelters, house, and user-created waypoints may be made available from waypoint information pages. These can be accessed by using the "nearest" format and selecting from one or more file tabs. Selecting a desired waypoint will provide a page showing additional waypoint information.

Using the GPS capabilities of the device, a map page can graphically depict the device's position. For example, the device's position can be graphically depicted relative to landmarks, navigation aids, county and state boundary lines, lakes, rivers, coastlines, cities, and roadways (including highways and streets). The device's present position can also be indicated by a pointer symbol. In the various embodiments, a calculated route can appear on a cartographic or map presentation as a bold line. A track log (which shows where the device has been) can appear as a series of small points or dashes. In this manner a user can easily retrace the route they have taken. The map display can also have a number of range scales, e.g. 20 feet to 800 miles (5 meters to 1200 kilometers). Other sizes are also possible. The map scale can be controlled by the input keys.

FIGS. 3A–3F, illustrate a number of display screen embodiments which are operable with the present invention. That is, the software of the present invention is operable to present data and provide various user interfaces on a display, such as those described herein.

Figure 3A:
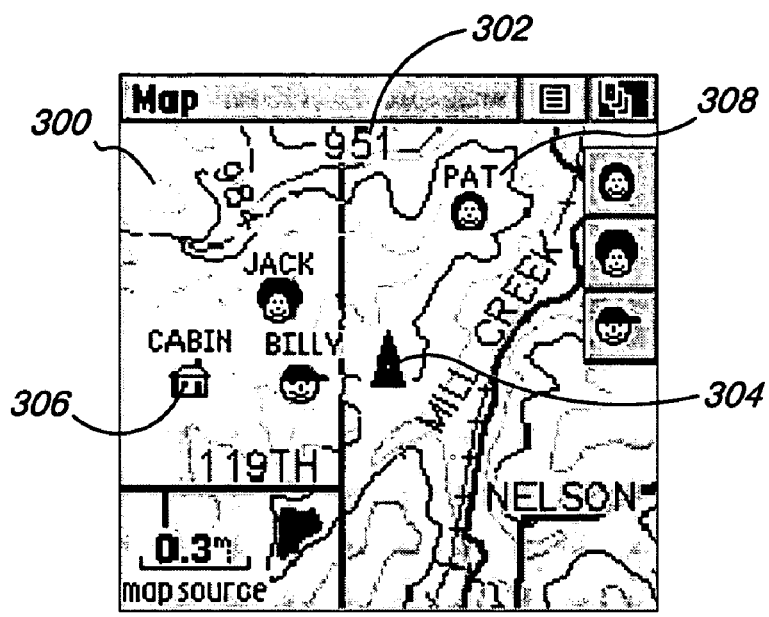
FIGS. 3A–3F, illustrate a number of display screen embodiments which are operable with the navigation device.

For example, FIG. 3A provides a map display 300 showing cartographic data 302 which includes, but is not limited to, county and state border, highways, streets, cities, and the like. In various embodiments, the displays of the present invention can be accessed and displayed using selectable menus shown on a display screen and/or through use of input devices on the device. As shown, map display 300 can include present location 304, waypoints 306, indicators and locations of contacts 308 that are in communication with the device (e.g., other devices that are in wireless communication and/or tracking the instant device) along with cartographic data 302, such as cities, streets, rivers, lakes, topographic data, and county and state borders, to name only a few.

Figure 3B:
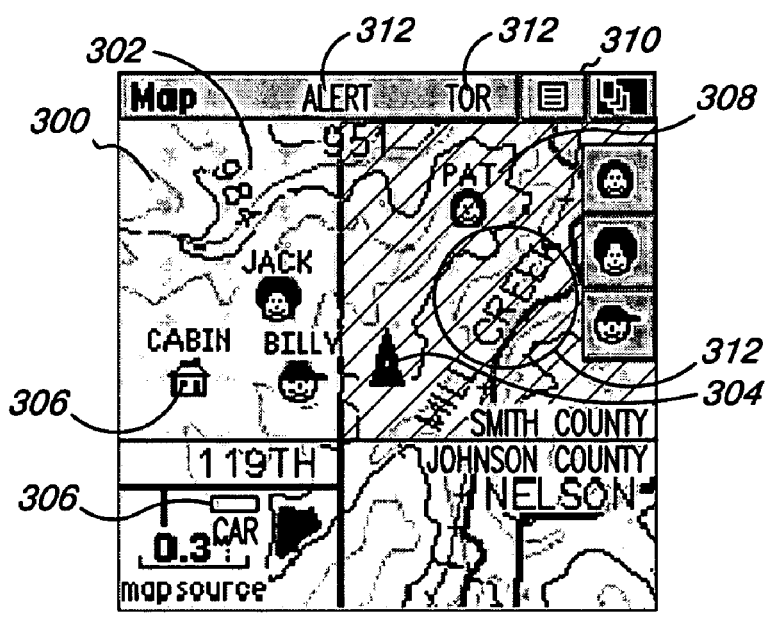

FIG. 3B illustrates an example of an alert display 310. Alert display 310 can include cartographic data 302, as shown in map display 300, along with an alert 312. Alert 312 can also include a text message of the nature of the alert, along with a visual change in the display. The visual change can include, but is not limited to, highlighting and/or flashing of the area of the display that represents the county(s) and/or part of the county that is the subject of the alert received from a SAME signal. In addition, an audio alert and/or mechanical alert (e.g., vibration alert) can also be generated by the device in addition to, or in place of, the visual change in display 310.

Figure 3C:
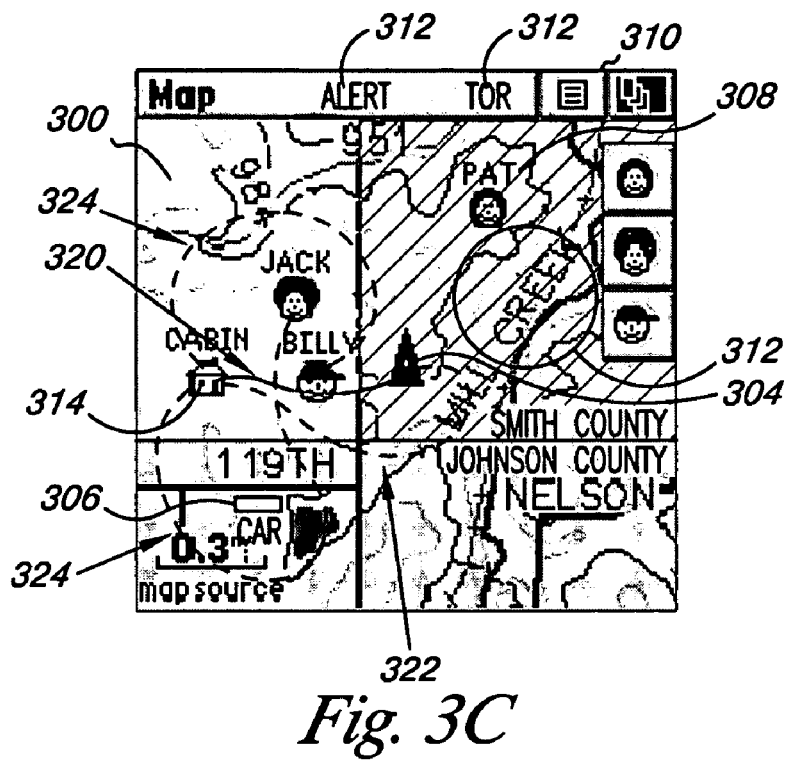

FIG. 3C illustrates an embodiment of an alert display 310 with a "Goto" waypoint 314. In one example, "Goto" waypoint 314 can be a selected position, such as a destination point for the user of the device. One or more way points can be either selected by the user or suggested by the device. As discussed herein, the device can calculate a route 320 between the present position and the selected position. Indications of a track log can also be displayed on the map display with "Goto" waypoint 314, where the track log is indicated by, for example, dotted lines 322 showing the route that has been traveled by the device. Track logs 324 of other device users in communication with the device can also be displayed on the map display with "Goto" waypoint 314.

Figure 3D:
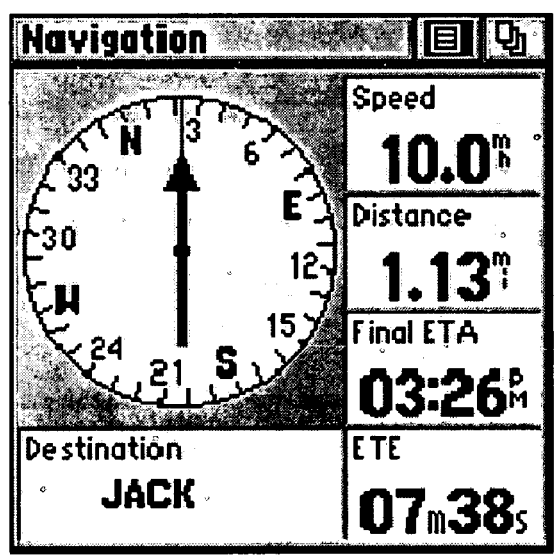

FIG. 3D illustrates an embodiment of a navigation display 330. In one embodiment, navigation display 330 embodiment of FIG. 3D can operate in conjunction with alert display 310 with the "Goto" waypoint. For example, navigation display 330 provides a graphic compass having an indicator (e.g., an arrow) pointing in a direction to "Goto" waypoint 314 (shown in FIG. 3C) identified at least in alert display 310 with "Goto" waypoint 314. In addition, navigation display 330 can also show travel data, including device speed, distance the device has traveled, estimated time of arrival for the device at the "Goto" waypoint, enroute time estimation (ETE) to the waypoint 314, and any indicator associated with "Goto" waypoint 314.

Figure 3E:
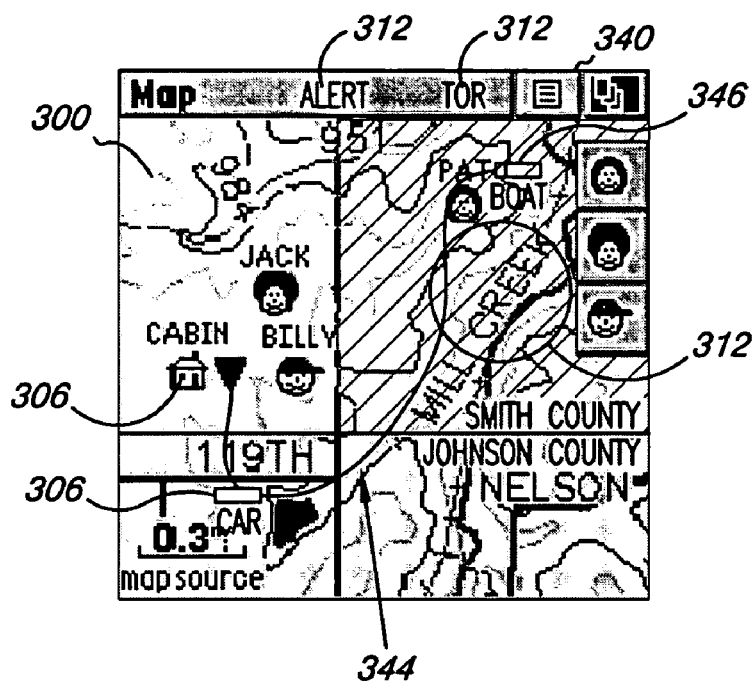

FIG. 3E illustrates an embodiment of a route display 340. Route display 340 can include a route 344 between at least two of a number of waypoints 306 (e.g., between the car and the boat, as shown in FIG. 3E). In the present embodiment, route 344 is shown as a bold line. When route 344 crosses an area (e.g., one or more counties) for which location information for one or more weather signals from a SAME signal have been received, route display 340 provides an alert 312, as discussed herein. The user can select alternative waypoints and/or a destination in order to avoid the area (e.g., county) associated with the weather signal.

Figure 3F:
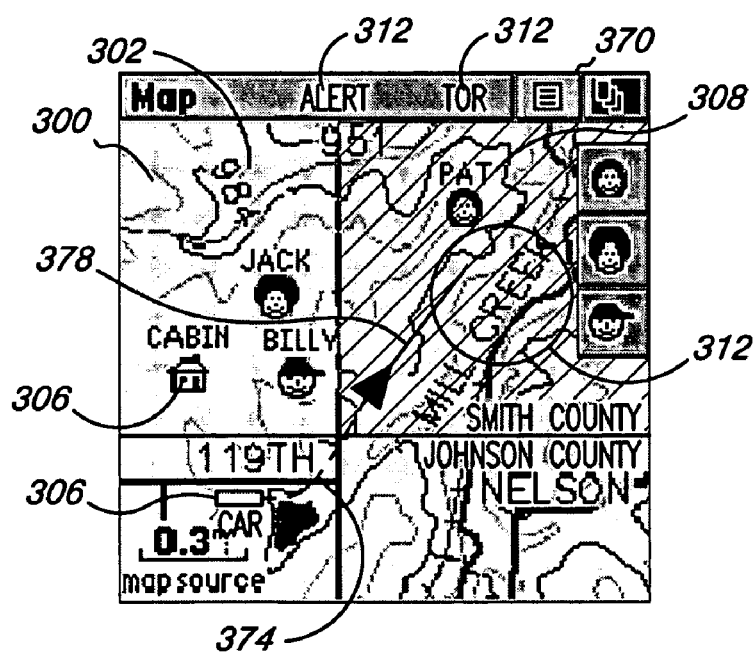

FIG. 3F illustrates an embodiment of a track log display 370. Track log display 370 can include a track log 374 shown with a broken line, along with a heading 378, shown with a solid line, determined from GPS capabilities, based on the route, or derived from a track log. In one embodiment, heading 378 provides an estimation of the path along which the device will most likely travel based upon available cartographic data (e.g., highways, streets, topographic constraints). When heading 378 crosses an area (e.g., one or more counties) for which location information for one or more weather signals from a SAME signal have been received, track log display 370 provides an alert 312, as discussed herein. The user can select alternative waypoints and/or a destination in order to avoid the area (e.g., county) associated with the weather signal.

According to the various embodiments of the present invention, a navigation device, including software operable thereon, can monitor position and/or speed (derived from GPS) and the relative positions of the nearest user waypoints and other users of associated navigation devices. Using the software of the present invention, the location and the county codes for utilizing SAME transmissions can automatically be loaded and up-dated, without any user intervention, as the device is moved from location to location. In addition, the device can also monitor any SAME signals for adjacent counties to its present location, and provide weather alerts when a route or heading is likely to take the user of the device through the county that is the subject of the weather alert.

Figure 4:
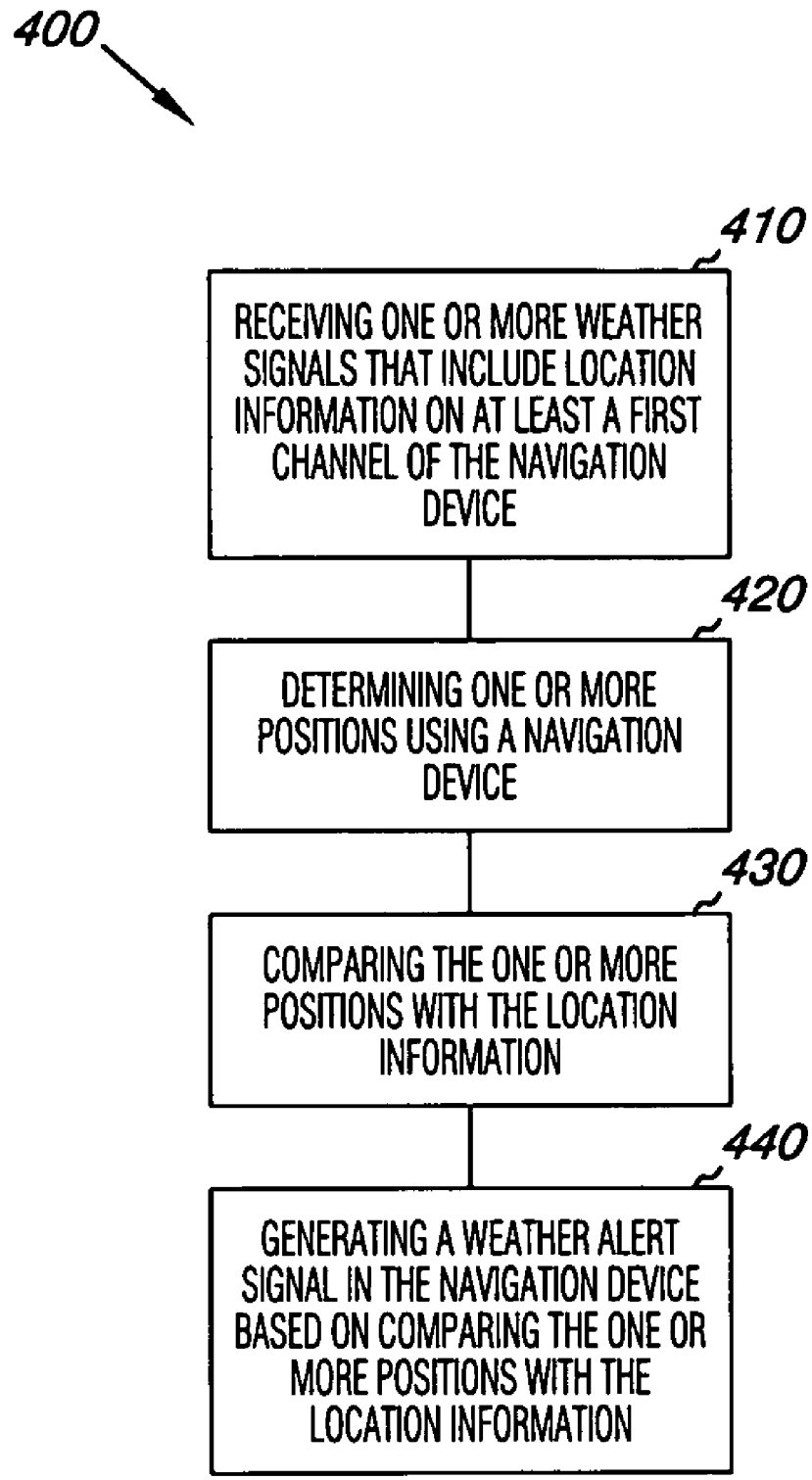
FIGS. 4–6 are block diagrams illustrating various method embodiments.
Figure 5:
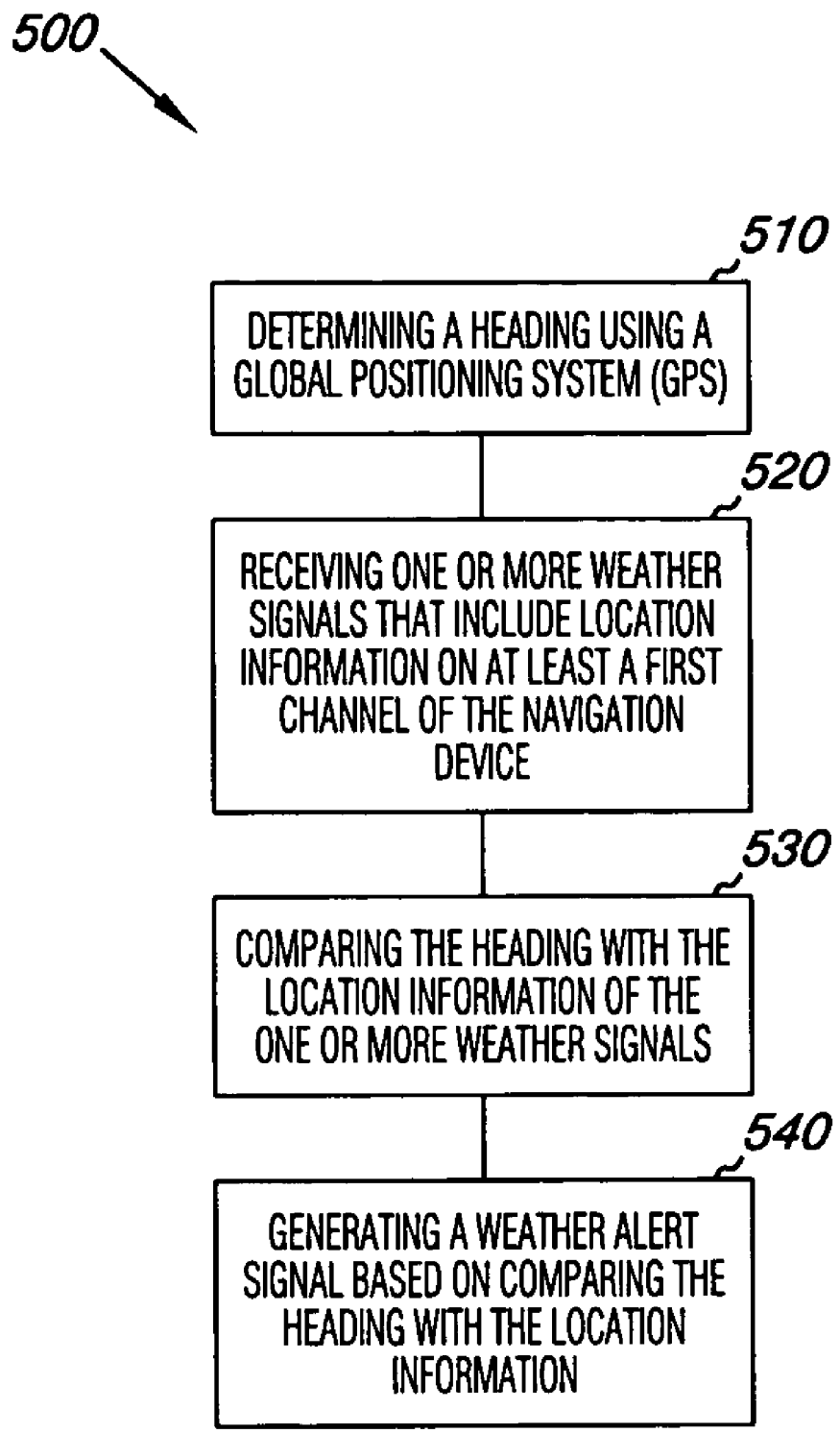
Figure 6:
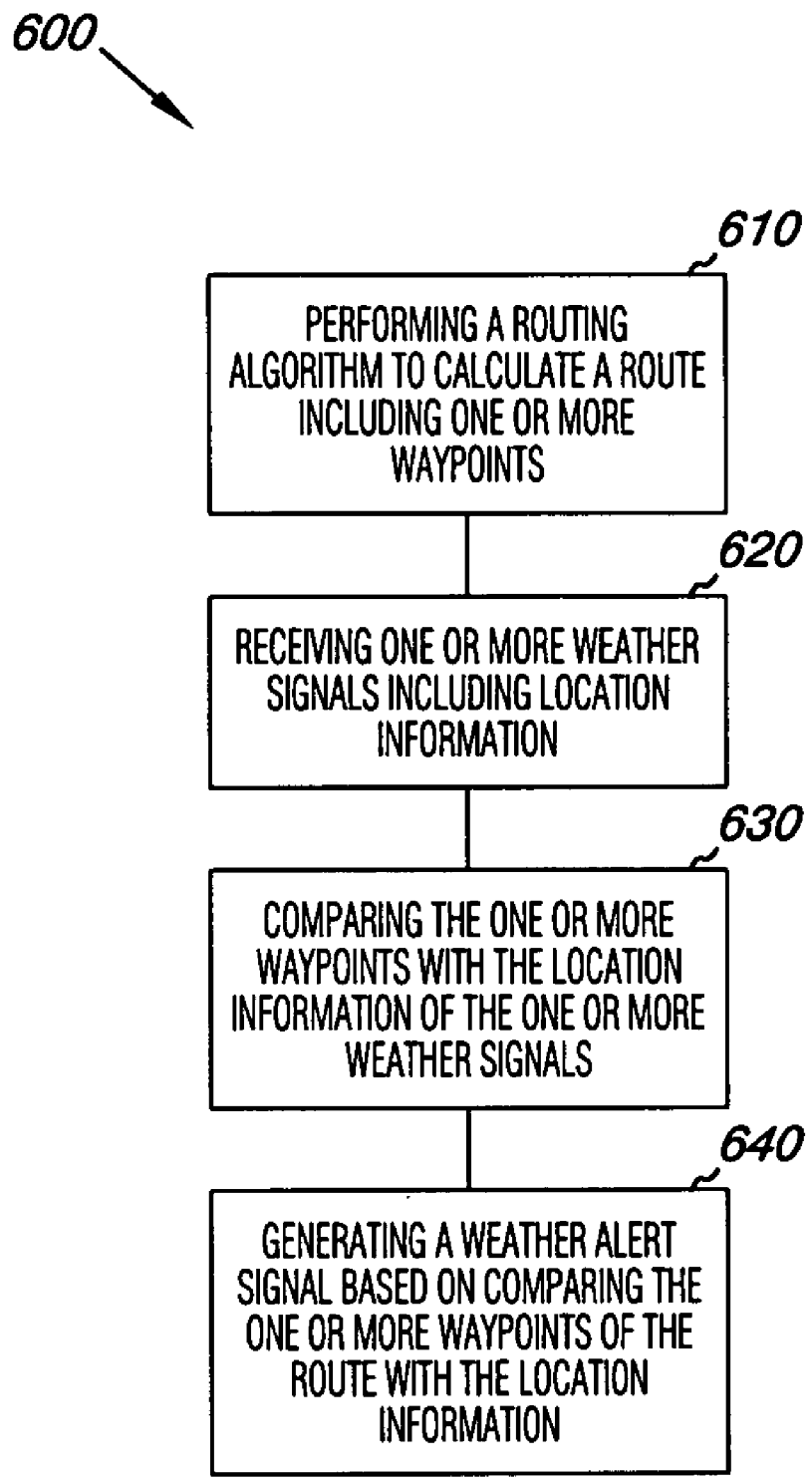

FIGS. 4–6 are block diagrams illustrating various method embodiments of the invention. As one of ordinary skill in the art will understand, the methods can be performed by software, application modules, and computer executable instructions operable on the systems and devices shown herein or otherwise. The invention, however, is not limited to any particular operating environment or to software written in a particular programming language.

FIG. 4 is a block diagram illustrating one method according to an embodiment of the present invention. It should be understood by those of ordinary skill in the art that one or more of the methods provided herein may be executed in a different order than that described herein. That is, elements of each method claim do not need to be executed in the order shown unless it is stated herein that such order is explicitly required.

As shown in FIG. 4, a method 400 for generating a weather alert in a navigation device is provided. The method includes receiving one or more weather signals on at least a first channel of the navigation device, 410, where the one or more weather signals include location information. For example, weather signal location information can be provided from a received Specific Area Message Encoding (SAME) signal. At 420, the method further includes determining one or more positions using a navigation device. In the various embodiments, determining the one or more positions further includes determining the positions from a global positioning system (GPS) enabled navigation device. The method further includes comparing the one or more positions with the weather signal location information at 430. At 440, the method includes generating a weather alert in the navigation device based on the comparison of the one or more positions with the weather signal location information.

In the various embodiments, the method further includes receiving and transmitting one or more voice data signals, where receiving and transmitting the voice data signals can be accomplished on a Family Radio Service (FRS) frequency. Receiving and transmitting the voice data signals can also be accomplished on other frequencies, if so desired. In one embodiment, when a weather alert is generated, the receiving and transmitting of the one or more voice data signals of the navigation device can be interrupted with the weather alert. In an additional embodiment, the weather alert can be used to generate an audio and/or mechanical alert, as described herein.

FIG. 5 is a block diagram illustrating another method according to an embodiment of the present invention. As shown in FIG. 5, a method 500 for comparing a heading with location information of the one or more weather signals is provided. The method includes determining a heading using a global positioning system (GPS) at 510. In one embodiment, the heading can be determined from a track log recorded based on the one or more positions.

At 520, the method further includes receiving one or more weather signals on at least a first channel of a navigation device, where the one or more weather signals include location information. In one embodiment, the location information can be provided from receiving a Specific Area Message Encoding (SAME) signal, as described herein, that includes the location information. The method further includes comparing the heading with the location information at 530, and generating a weather alert based on the comparison of the heading with the location information at 540. In one embodiment, this method, along with others described herein, allows for an alert to be generated prior to the user of the device entering into an area where a weather alert has been issued.

FIG. 6 is a block diagram illustrating another method according to an embodiment of the present invention. As before, any of the methods described herein can be performed with a set of computer readable instructions storable on a computer readable medium. As shown in FIG. 6, a method 600 embodiment includes performing a routing algorithm to calculate a route at 610, where the route includes one or more waypoints. In various embodiments, performing the routing algorithm can include selecting one or more waypoints for the calculated route, where the one or more waypoints are incorporated into the route.

At 620, the method further includes receiving one or more weather signals, where the one or more weather signals include location information. For example, receiving the one or more weather signals can include receiving the one or more weather signals on at least a first channel of a navigation device. The method further includes comparing the one or more waypoints with the location information of the one or more weather signals at 630, and generating a weather alert based on the comparison of the one or more waypoints of the route with the location information at 640.

In the various embodiments, the method further includes receiving the location information by receiving a Specific Area Message Encoding (SAME) signal, as described herein, that includes the location information. In addition, the method can further include receiving and transmitting one or more voice data signals, and generating the weather alert, as described herein.

In addition, the method further includes selecting one or more waypoints upon generating the weather alert. In one example, the one or more waypoints can be selected by the user through the display of the device, as described herein. The method can further include determining a present location based on a signal from a global positioning system (GPS) signal. Using the present location and the one or more waypoints, the routing algorithm can be performed to calculate the route between the present position and the selected waypoints. In one embodiment, this method, along with others described herein, allows for a user to have a route generated between their present location and one or more selected waypoints so as to best avoid areas where a weather alert has been issued.

As discussed herein, the embodiment of the methods, systems, and devices of the present invention can also be used in conjunction with other navigation systems, such as, for example, marine based devices for providing marine charts having similar types of alerts, as described herein, and automotive based devices for providing driving directions and screen displays (e.g., turn-by-turn directions).

In addition, one of ordinary skill in the art will appreciate upon reading and understanding this disclosure that other variations on the above scenario are included within the scope of the present invention. That is, the GPS based navigation device according to the various embodiments of the present invention can allow a user to receive one or more weather signals containing location information for the weather signals, determine one or more positions, automatically compare the positions, routes, and/or waypoints with the location information of the weather signals, and generate an alert, for example a weather alert, based on the comparison of the positions with the location information of the weather signals. The position and location information are both automatically acquired through the embodiments of the methods, devices, and systems of the present invention. This alleviates the need for the user to know and input into the device their location. For example, the user of the device need not know which county they are in, or the adjacent counties, so as to provide specific SAME code numbers for the counties. This information is automatically acquired and updated in the embodiments of the methods, devices, and systems of the present invention. The information can be used in conjunction with SAME signals from the NWR broadcasts so the device illustrated in the embodiments of the present invention can provide alerts to the user.

Embodiments of the system of the present invention includes software operative on a processor to perform methods according to the teachings of the present invention. One of ordinary skill in the art will understand, upon reading and comprehending this disclosure, the manner in which a software program can be launched from a computer readable medium in a computer based system to execute the functions defined in the software program. One of ordinary skill in the art will further understand the various programming languages which may be employed to create a software program designed to implement and perform the methods of the present invention. However, embodiments of the present invention are not limited to a particular programming language or environment.

Although specific embodiments have been illustrated and described herein, those of ordinary skill in the art will appreciate that an arrangement calculated to achieve the same techniques can be substituted for the specific embodiments shown. This disclosure is intended to cover adaptations or variations of various embodiments of the invention. It is to be understood that the above description has been made in an illustrative fashion, and not a restrictive one. Combination of the above embodiments, and other embodiments not specifically described herein will be apparent to those of skill in the art upon reviewing the above description. The scope of the various embodiments of the invention includes other applications in which the above structures and methods are used. Therefore, the scope of various embodiments of the invention should be determined with reference to the appended claims, along with the full range of equivalents to which such claims are entitled.

In the foregoing Detailed Description, various features are grouped together in a single embodiment for the purpose of streamlining the disclosure. This method of disclosure is not to be interpreted as reflecting an intention that the embodiments of the invention require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed:

1. A method, comprising:
   receiving one or more weather signals on at least a first channel of a navigation device, where the one or more weather signals include location information;
   determining one or more positions using the navigation device;
   comparing the one or more positions with the location information;
   generating a weather alert in the navigation device based on comparing the one or more positions with the location information;
   performing a routing algorithm to calculate a route, where the route includes one or more waypoints;
   comparing the one or more waypoints with the location information of the one or more weather signals; and
   generating the weather alert based on comparing the one or more waypoints of the route with the location information.

2. The method of claim 1, wherein determining the one or more positions further includes determining the positions from a global positioning system (GPS) enabled navigation device.

3. The method of claim 1, wherein receiving one or more weather signals on at least the first channel of the navigation device includes receiving a Specific Area Message Encoding signal that includes the location information.

4. The method of claim 1, wherein the method further includes receiving and transmitting one or more voice data signals.

5. The method of claim 4, wherein the method further includes receiving and transmitting the one or more voice data signals on a Family Radio Service (FRS) frequency.

6. The method of claim 4, further including interrupting the receiving and transmitting of the one or more voice data signals of the navigation device with the weather alert.

7. The method of claim 1, wherein, upon generating the weather alert, the method further includes;
   selecting one or more waypoints;
   determining a present location based on a signal from a global positioning system (GPS); and
   performing the routing algorithm to calculate the route between the present position and the selected waypoints.

8. The method of claim 7, wherein selecting one or more waypoints includes selecting one or more destination points.

9. The method of claim 1, further including recording a track log;
   determining a heading based on the track log;
   comparing the heading with the location information of the one or more weather signals; and generating the weather alert in the navigation device based on comparing the heading with the location information.

10. A method, comprising:

determining one or more positions using a global positioning system (GPS) signal;

recording a track log based on the one or more positions;

receiving one or more weather signals on at least a first channel of a navigation device, where the one or more weather signals include location information;

determining a heading based on the track log;

comparing the heading with the location information of the one or more weather signals;

generating a weather alert based on comparing the heading with the location information;

performing a routing algorithm to calculate a route, where the route includes one or more waypoints;

comparing the one or more waypoints with the location information of the one or more weather signals; and generating the weather alert based on comparing the one or more waypoints of the route with the location information.

11. The method of claim 10, wherein receiving one or more weather signals on at least the first channel of the navigation device includes receiving a Specific Area Message Encoding signal including the location information.

12. The method of claim 10, further including receiving and transmitting one or more voice data signals.

13. The method of claim 12, further including receiving and transmitting the one or more voice data signals on a Family Radio Service (FRS) frequency.

14. The method of claim 10, wherein, upon generating the weather alert, the method further includes;

selecting one or more way points;

determining a present location based on a signal from a global positioning system (GPS); and performing the routing algorithm to calculate the route between the present position and the selected waypoints.

15. The method of claim 14, wherein selecting one or more waypoints includes selecting one or more destination points.

16. A method, comprising:

performing a routing algorithm to calculate a route, where the route includes one or more waypoints;

receiving one or more weather signals on at least a first channel of a navigation device, where the one or more weather signals include a location information;

comparing the one or more waypoints with the location information of the one or more weather signals; and generating the weather alert based on comparing the one or more waypoints of the route with the location information.

17. The method of claim 16, further including selecting one or more waypoints for the route, and wherein performing the routing algorithm includes incorporating the one or more waypoints into the route.

18. The method of claim 16, wherein receiving one or more weather signals includes receiving the one or more weather signals on at least a first channel of a navigation device, where the weather signals include a Specific Area Message Encoding signal having location information.

19. The method of claim 16, wherein, upon generating the weather alert, the method further includes;

selecting one or more waypoints;

determining a present location based on a signal from a global positioning system (GPS); and performing the routing algorithm to calculate the mute between the present position and the selected waypoints.

20. The method of claim 16, wherein the method further includes receiving and transmitting one or more voice data signals.

21. The method of claim 20, further including receiving and transmitting the one or more voice data signals on a Family Radio Service (FRS) frequency.

22. The method of claim 20, further including interrupting the receiving and transmitting of the one or more voice data signals of the navigation device with the weather alert.

23. A computer readable medium having a set of computer readable instructions, the set of computer readable instructions comprising instructions for:

receiving one or more weather signals on at least a first channel of the navigation device, where the one or more weather signals include a location information;

determining one or more positions using a navigation device;

comparing the one or more positions with the location information;

generating a weather alert in the navigation device based on comparing the one or more positions with the location information;

performing a routing algorithm to calculate a route, where the route includes one or more waypoints;

comparing the one or more waypoints with the location information of the one or more weather signals; and generating the weather alert based on comparing the one or more waypoints of the route with the location information.

24. The computer readable medium of claim 23, wherein determining the one or more positions further includes determining the positions from a global positioning system (GPS) enabled navigation device.

25. The computer readable medium of claim 23, wherein receiving one or more weather signals on at least the first channel of the navigation device includes receiving a Specific Area Message Encoding signal including the location information.

26. The computer readable medium of claim 23, further including interrupting one or more voice data signals of the navigation device with the weather alert.

27. The computer readable medium of claim 23, wherein, upon generating the weather alert, the method further includes;

selecting one or more waypoints;

determining a present location based on a signal from a global positioning system (GPS); and performing the routing algorithm to calculate the route between the present position and the selected waypoints.

28. The computer readable medium of claim 23, further including recording a track log;

determining a heading based on the track log;

comparing the heading with the location information of the one or more weather signals; and generating the weather alert in the navigation device based on comparing the heading with the location information.

29. A navigation device, comprising:

a processor:

a memory operably coupled to the processor;

a global positioning system (GPS) receiver operably coupled to the processor and the memory for determining a position of the navigation device;

a weather receiver operably coupled to the processor for receiving one or more weather signals, where the one or more weather signals include a location information, wherein the processor is operable to compare the location information of the one or more weather signals with the position of the navigation device, and operable to generate a signal for a weather alert based on a result of the comparison; and wherein the memory includes cartographic data including a number of waypoints, wherein the processor is operable to perform a routing algorithm to calculate a route between at least two of the number of waypoints, and wherein the processor is operable to compare the one or more waypoints of the route with the location information of the one or more weather signals, and generate an alert for a weather alert based on the comparison.

30. The navigation device of claim 29, further including a transceiver operably coupled to the processor to wirelessly transmit and receive voice data signals with an electronic device.

31. The navigation device of claim 30, wherein the transceiver is operable to transmit and to receive voice data signals on a Family Radio Service (FRS) frequency.

32. The navigation device of claim 30, wherein the processor is operable to interrupt the transceiver operation with the weather alert.

33. The navigation device of claim 29, wherein the one or more weather signals includes a Specific Area Message Encoding signal including the location information.

34. The navigation device of claim 29, further including at least one input operably coupled to the processor and capable of receiving data on a selected position, wherein upon generating the weather alert, the processor receives data on the selected position through the at least one input, the GPS receiver determines a present position, and the processor operates on the routing algorithm to plot the route between the present position and the selected position.

35. The navigation device of claim 29, wherein the processor operates on a track log algorithm to record a track log based on the position of the navigation device, and the processor operates on a heading algorithm to determine a heading based on the track log, where processor operates on the comparison algorithm to compare the heading with the location information of the one or more weather signals, and generates the signal for the weather alert based on the result of the comparison.

36. The navigation device of claim 29, further includes a display operable to graphically present the weather alert.

37. The navigation device of claim 29, further includes an audio output device operable to audibly present the weather alert.

38. A method for providing location specific alerts, the method comprising the steps of:

receiving in a navigation device indication from a user of a destination;

determining in the navigation device a starting point;

determining in the navigation device at least one heading from the starting point to the destination;

receiving in the navigation device one or more weather signals, wherein the weather signals include location information relating to adverse weather conditions;

determining in the navigation device if any of the adverse weather conditions are expected to be encountered along the heading from the starting point to the destination; and generating in the navigation device a weather alert it any of the adverse weather conditions are expected to be encountered along the heading from the starting point to the destination.

* * * * *